United States Patent
Kubo et al.

(10) Patent No.: US 6,547,665 B2
(45) Date of Patent: Apr. 15, 2003

(54) GAME CHARACTER GENERATING METHOD, STORAGE MEDIUM AND VIDEO GAME DEVICE

(75) Inventors: Morikuni Kubo, Tokyo (JP); Atsushi Suzuki, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/865,729

(22) Filed: May 29, 2001

(65) Prior Publication Data

US 2001/0053716 A1 Dec. 20, 2001

(30) Foreign Application Priority Data

Jun. 1, 2000 (JP) ........................................ 2000-164036

(51) Int. Cl.$^7$ ................................................ A63F 13/00
(52) U.S. Cl. ........................................... 463/43; 463/44
(58) Field of Search ............................... 463/43, 29, 44, 463/30, 31; 273/148 B; 709/217; 345/547

(56) References Cited

U.S. PATENT DOCUMENTS 4,572,509 A  * 2/1986 Sitrick
5,882,262 A  * 3/1999 Ballhorn ...................... 463/43
6,035,400 A  * 3/2000 Yasuoka ...................... 713/200
6,132,315 A  * 10/2000 Miyamoto et al. ............. 463/43

FOREIGN PATENT DOCUMENTS

| JP | 11-7504 | 1/1999 |
| JP | 11-114226 A | 4/1999 |

OTHER PUBLICATIONS

Konami's combination ROM–composite Technique.

* cited by examiner

*Primary Examiner*—Chen Wen Jiang
(74) *Attorney, Agent, or Firm*—Sughrue Mion PLLC (57) ABSTRACT

In a video game program executed by a video game device, comprising a first external storage device storing a video game program and a second external storage device storing data generated by executing the video game program, a game character is generated by referencing character data indicating the status of the game character. If the data generated by the video game program and stored in the second external storage device is called user data, then the video game program generates the game character by referencing data other than the user data, according to the state of the second external storage device.

19 Claims, 7 Drawing Sheets

GAME CHARACTER GENERATING METHOD, STORAGE MEDIUM AND VIDEO GAME DEVICE

BACKGROUND OF THE INVENTION

1. Field of the Invention

The present invention relates to the generation of game characters in a video game, and more particularly, to the generation of game characters in a video game such that a contest or competition is performed between game characters each of which is generated by referencing a plurality of character data.

2. Description of the Related Art

A wide variety of proposals have been offered about video game programs which provide video games implemented between a plurality of game characters in a competitive manner. Such games are known as competitive play or competitive mode games, or the like. The game characters take part in a video game as a representation of the players who are actually playing the video game, and they compete with the other game characters. Here, if human players determine the actions of the respective game characters participating in the contest, then a human vs. human contest is executed. On the other hand, there are also the cases where a contest is implemented between game characters whose actions are determined by the video game program, and the other game characters whose actions are determined by a human player. Hereinafter, game characters whose actions are determined by a human are called "player characters", and game characters whose actions are determined by the video game program are called "CPU characters".

In general, a video game program of this kind handles game characters by preparing respectively independent character data for each game character participating in the competition. For example, in a human vs. human contest, each player previously creates character data for his or her own player character, and each player provides his or her own character data in order to play a game. In the cases where the game characters taking part in the contest also include CPU characters, if the player has not been able to prepare his or her own character data, then character data previously prepared in conjunction with the video game program is used.

If a game character is generated using previously prepared character data in this way, then this data is selected from a plurality of character data items. This data may be selected, for example, in a manner such that a list of character data is displayed and the player selects the data him or herself. Alternatively, the data may be determined randomly. However, the above-mentioned manners are problematic in that they afford little variation.

Moreover, these manners are also problematic in that either is liable to become monotonous or boring. In particular, in a video game of a competitive type, selecting character data means selecting an opponent character. It is desirable that the player is caused to feel a certain degree of tension. But, in the conventional methods described above, it is difficult to maintain a level of psychological tension in the player, and consequently, the player may become bored with the game in a short period of time.

SUMMARY OF THE INVENTION

The present invention was devised in consideration of the foregoing problems. Specifically, an object of the present invention is to provide a game character generating method which enhances the diversity of character data selection methods.

Moreover, a further object of the present invention is to provide a game character generating method whereby a feeling of tension can be imparted to the player actually creating the game characters.

In order to achieve the aforementioned objects, the present invention provides a game character generation method, a computer-readable storage medium and a video game device as described below.

The present invention provides a game character generation method of generating a game character in accordance with a video game program stored in a first storage device of a video game device. The method comprises the steps of: preparing a data set generated by an additional video game program different from the video game program; and generating the game character by referencing the data set.

The game character generation method may further comprise the step of judging whether a second storage device, which is detachable from the video game device, is attached to the video game device or not. In this case, the game character generating step generates a predetermined game character stored in the first storage device if the second storage device is detached from the video game device.

When the game character generation method comprises the judging step, the method may further comprises the step of storing, prior to the game character generating step, the data set which serves to generate the predetermined game character and which is stored in the first storage device.

When the game character generation method comprises the judging step, and the second storage device is classified into a plurality of species, the method may further comprise the steps of: further preparing at least one additional data set generated by an additional video game program different from the video game program; detecting the species of the second storage device attached to the video game device; and selecting one of the data set and the additional data set stored in the first storage device according to the detected species. In this case, the game character generating step generates the game character by referencing the selected data set.

In this method, the video game device may comprise a second storage device which is detachable from the video game device. In this case, the game character generating step generates the game character by referencing the data set stored in the second storage device by the additional video game program. Instead of referencing the data set, the file name of the data set may be referred.

For example, the video game program is of a competitive type between a plurality of the game characters. In this case, at least one game character of the plurality of game characters participating in a competition may be generated by the video game program. Furthermore, the data set may define cards possessed by the game character.

Moreover, the present invention provides a computer-readable storage medium storing a video game program executed by a video game device which comprises a first storage device for installing the storage medium. The video game program comprises the steps of: preparing a data set generated by an additional video game program different from the video game program; and generating the game character by referencing the data set.

The video game program may further comprises the step of judging whether a second storage device, which is detachable from the video game device, is attached to the video game device or not. In this case, the game character generating step generates a predetermined game character stored in the first storage device if the second storage device is detached from the video game device.

The storage medium may further store the data set which serves to generate the predetermined game character and which is stored in the first storage device. In this case, when the second storage device is classified into a plurality of species, the video game program may further comprises the steps of: further preparing at least one additional data set generated by an additional video game program different from the video game program; detecting the species of the second storage device attached to the video game device; and selecting one of the data set and the additional data set stored in the first storage device according to the detected species; wherein the game character generating step generates the game character by referencing the selected data set.

The video game device may comprise a second storage device which is detachable from the video game device. In this case, the game character generating step may generate the game character by referencing the data set stored in the second storage device by the additional video game program. Instead of the data set itself, its file name may be referred.

The video game program may be of a competitive type between a plurality of the game characters. In this case, for example, at least one game character of the plurality of game characters participating in a competition is generated by the video game program.

The video game program may be for performing a competitive type card game. In this case, the data set defines cards possessed by the game character.

According to the present invention, a video game device performing a plurality of video game programs is provided. The video game device comprises: a storage device for storing user data sets each of which is generated by one of the video game programs; another storage device for storing a data set generated by another one of the video game programs; and accessing means for accessing the storage device and another storage device in accordance with the one of the video game programs to generate a game character with reference to the data set stored in another storage device.

DESCRIPTION OF THE PREFERRED EMBODIMENTS

A video game system 1 according to one embodiment of the present invention is described below with reference to the drawings. The video game system 1 comprises a video game device 100 and a CD-ROM storing a video game program 200 which is operated by the video game device 100. The video game device 100 is now described with reference to FIG. 1.

1. Video game device 100

The video game device 100 reads out programs and data stored on the CD-ROM and outputs images and sounds to a player. The player is able to play a game, or the like, by manipulating the controller.

Figure 1:
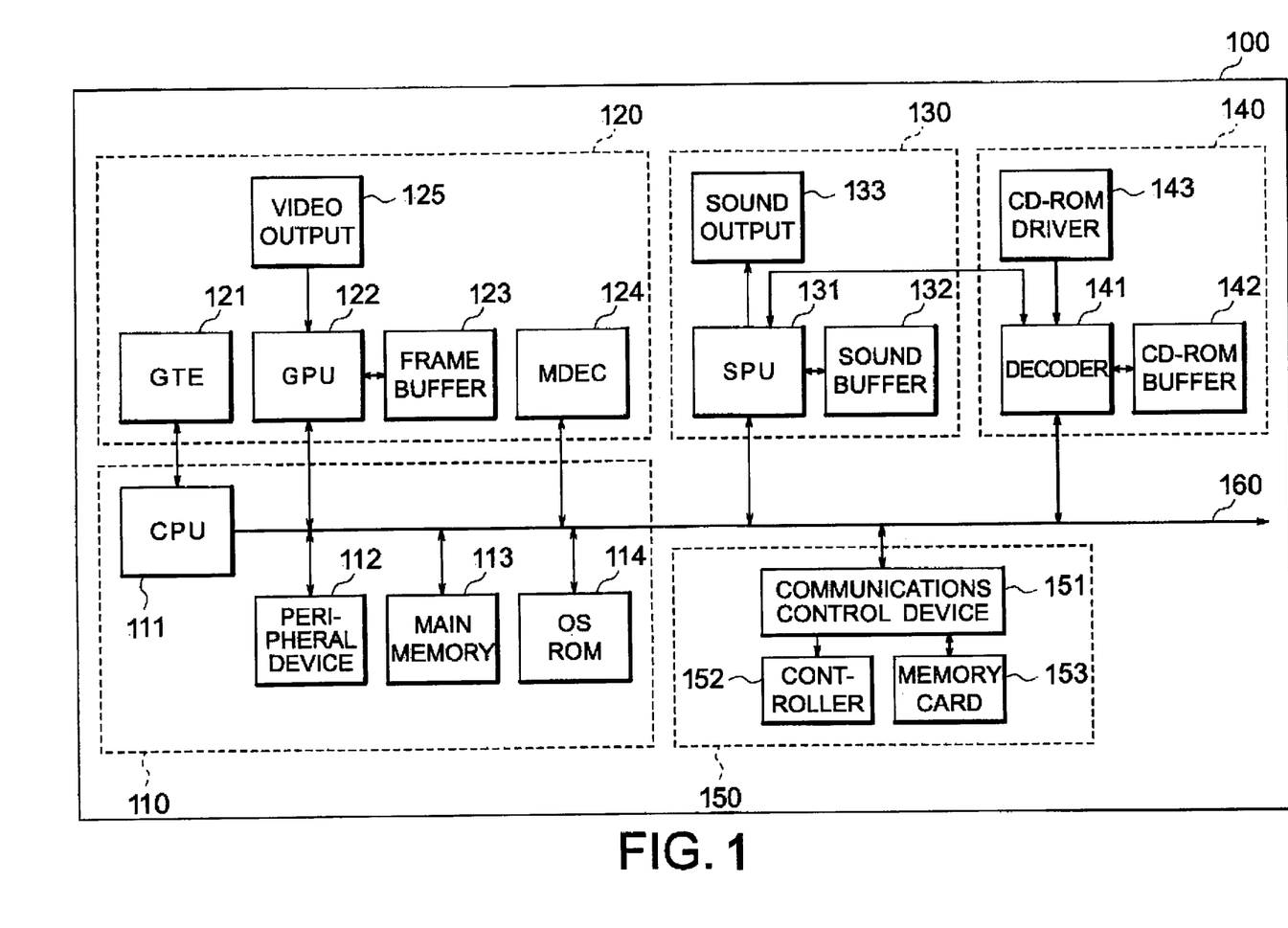
FIG. 1 is a functional block diagram of a video game device 100 constituting a video game system 1 forming one embodiment of the present invention.

An overview of the composition of the video game device 100 is now described with reference to FIG. 1. The video game device 100 comprises a control section 110 for controlling the operation of the whole device; an image processing section 120 for performing processing relating to image display; a sound processing section 130 for performing processing relating to sound output; an auxiliary storage control section 140 for reading out programs and data from the storage medium; a communications control section 150 for controlling reading and writing of data, such as player operations, game settings, game development status, and the like, and the input and output of other data; and a main bus 160 connecting from the aforementioned control section 110 through to the communications control section 150.

Next, the internal composition from the control section 110 to the communications control section 150 is described.

The control section 110 comprises: a CPU 111; a peripheral device controller 112 for performing control, such as interrupt control, time control, memory control, direct memory access (DMA) transfer control, and the like; a main storage device (main memory) 113 consisting of a RAM; and a ROM 114 for storing programs, such as an operating system (OS) for managing the main memory 113, image processing section 120, sound processing section 130, and the like. The CPU 111 controls the whole device by executing the OS stored in the ROM 114. The CPU 111 is also equipped with a command cache and scratchpad memory and manages the actual memory.

The image processing section 120 comprises: a geometry transfer engine (GTE) 121 consisting of a co-ordinates calculation co-processor for performing procedures, such as co-ordinates conversion, or the like; a graphics processing unit (GPU) 122 for performing drawing operations in accordance with drawing commands from the CPU 111; a frame buffer 123 for storing images drawn by the GPU 122; an image decoder (MDEC) 124 for decoding image data that has been subject to parallel transform, such as a so-called discrete cosine transform, and then further compressed and encoded; and a video output portion 125, such as a display device, or the like.

The sound processing section 130 comprises: a sound processing unit (SPU) 131 for generating sounds based on instructions from the CPU 111; a sound buffer 132 for storing data, such as sounds and music read out from the CD-ROM, and sound source data, and the like; and a sound output portion 133, such as an amplifier and speaker, or the like, for outputting sounds generated by the SPU 131.

The auxiliary storing control section 140 comprises: a CD-ROM driver 143 for reproducing programs, data, and the like stored on a CD-ROM disk; a decoder 141 for decoding programs, data, and the like, stored with appended error correction coding (ECC), for example; and a CD-ROM buffer 142 for temporarily storing reproduced data from the CD-ROM driver 143.

The communications control section 150 comprises a communications control device 151 for controlling communications with the CPU 111 by the main bus 160; a controller 152 for inputting instructions from a user; a memory card 153 for storing game settings, and the like; a parallel input/output (I/O) port 154 connected to the main bus 160; and an asynchronous serial input/output (I/O) port 155 similarly connected to the main bus 160.

In this way, the video game device 100 comprises two external memory devices: a CD-ROM drive device 143 and a memory card 153. Furthermore, due to differences in capacity, and the like, there are three types of memory card 153: type 1, type 2 and type 3. Type 1 and type 2 have different capacities. Type 3 does not simply comprise a storage medium, but is also provided with an input device, image display device and a control device, in such a manner that it may operate independently as a portable information terminal. The communications control device 151 is able to detect whether or not a memory card 153 is connected, and also to distinguish the types of memory card 153 connected, one another.

Next, an overview of the operation of the video game device 100 is described.

When the power supply of the video game device 100 is switched on, the OS stored in the ROM 114 is executed by the CPU 111, and the image processing section 120, sound processing section 130, and the like, enter under the control of the OS. Firstly, when the OS has performed initialization processes, such as operational checking, and the like, for the whole device, it controls the auxiliary storage control section 140 and executes the video game program 200 stored in the CD-ROM, or another video game program. In other words, the type of video game program executed by the video game device 100 is dependent on the CD-ROM loaded in the CD-ROM device 143, or more accurately speaking, the type of video game stored on that CD-ROM. When the video game program is executed, the CPU 111 controls the image processing section 120, the sound processing section 130, and the like, according to the program and the inputs made by the player via the controller 152, and images are displayed by the video output portion 125, whilst sounds, such as sound effects, music, and the like, are output from the sound output portion 133. User data generated by the program is stored as necessary on the memory card 153, as a file. The memory card 153 is capable of storing a plurality of data files, but these data files are not necessarily generated by a single video game program, but rather, in many cases, a plurality of data files generated by video game programs of different types are stored on a single memory card 153.

2. Video game program 200

The video game program 200 is described below. This video game program 200 is assumed to be a video game of the type wherein two game characters compete with each other in a card game.

To give an overview of this contest, the card game will be described below. The card game is played in a state where the two game characters are facing each other across a game space. Each game character has at least 40 cards. The game characters participating in the contest each build a group of cards, called a deck, by choosing 40 cards from the cards in their hands, before the contest, and they then use these decks to compete. At the start of the contest, both game characters start the game having a prescribed number of hit points, each. The game progresses by repeating victory/defeat judgement between the cards, and if a player wins in this victory/defeat judgement processing between the cards, then he or she is able to reduce the hit points of the other player. The object of the game is to reduce the other player's hit points to zero, or lower.

In a video game program 200 of this kind, the state of the respective game characters before participating in the contest is represented by the types of cards and numbers of cards that they are holding, this state being prepared in the form of character data. If the game character is one which is controlled by the input operations performed by the player by the controller 152 (hereinafter, called a "player character"), then, in principle, that character data is stored in the memory card 153. The character data may also be stored as user data along with the other data used by the video game program 200.

Here, it is supposed that a contest is implemented between a player character and a game character controlled by the video game program 200 (hereinafter, called a "CPU character"). The character data for the player character is stored in the memory card 153. Here, the process from selecting the character data required to generate a CPU character until generation of the CPU character will be described.

(1) Summary

Figure 2:
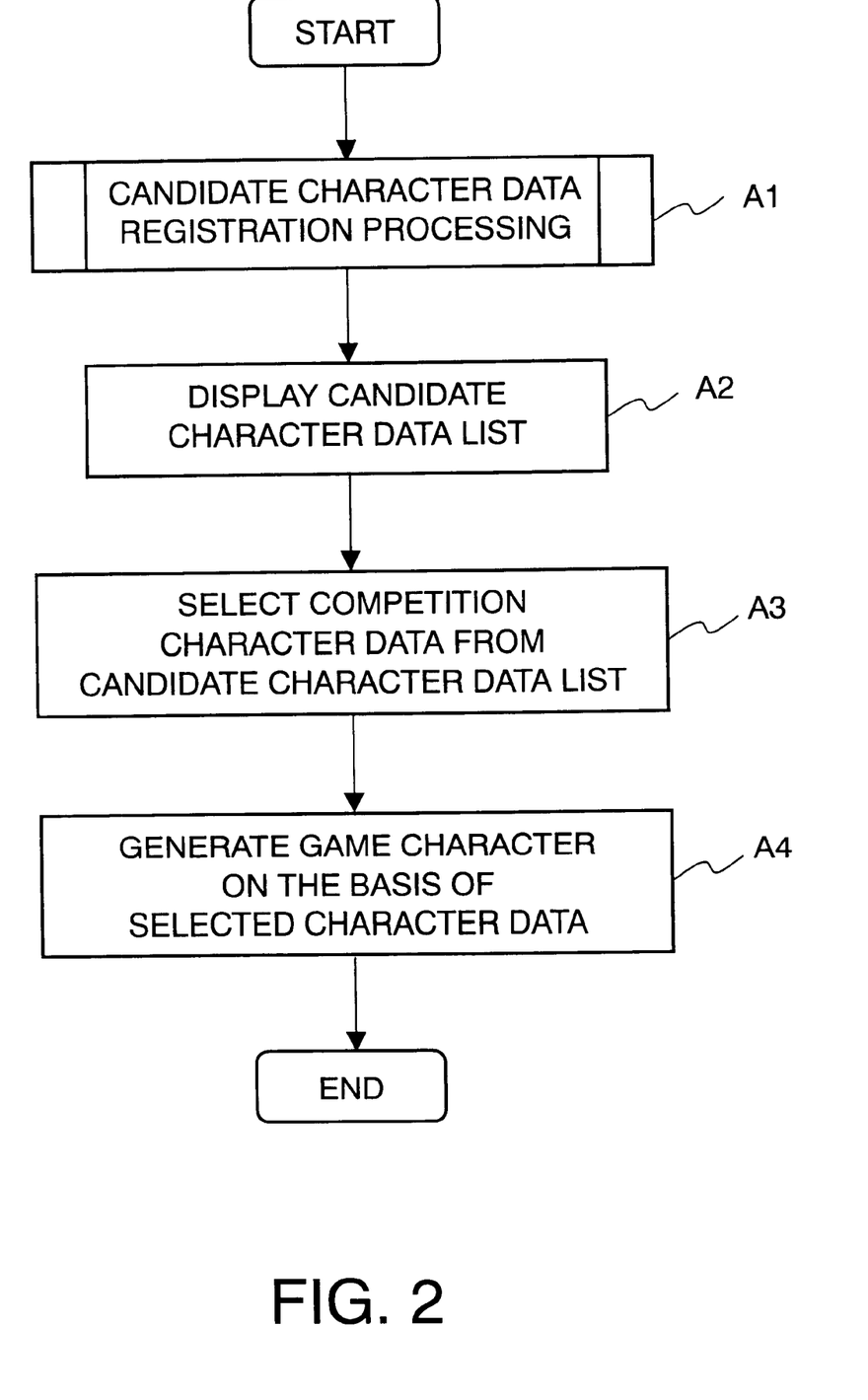
FIG. 2 is a flowchart describing a process whereby a video game program 200 generates a game character according to the state of a memory card.

To give an overview with reference to FIG. 2, firstly, the video game program 200 performs processing for registering candidate character data used when generating a CPU character, in other words, candidate character data registration processing (step A1). Thereupon, a list of the candidate character data registered by this process is displayed to the player by the video output portion 125 (step A2). If the player selects character data for a game character with which he or she wishes to compete, from the displayed list, by using the controller 152 (step A3), then the video game program 200 generates a CPU character on the basis of the selected character data. A contest is then implemented between the CPU character thus generated, and a player character generated on the basis of character data previously stored by the player in the memory card 153.

(2) Candidate Character Data Registration Processing

Figure 3:
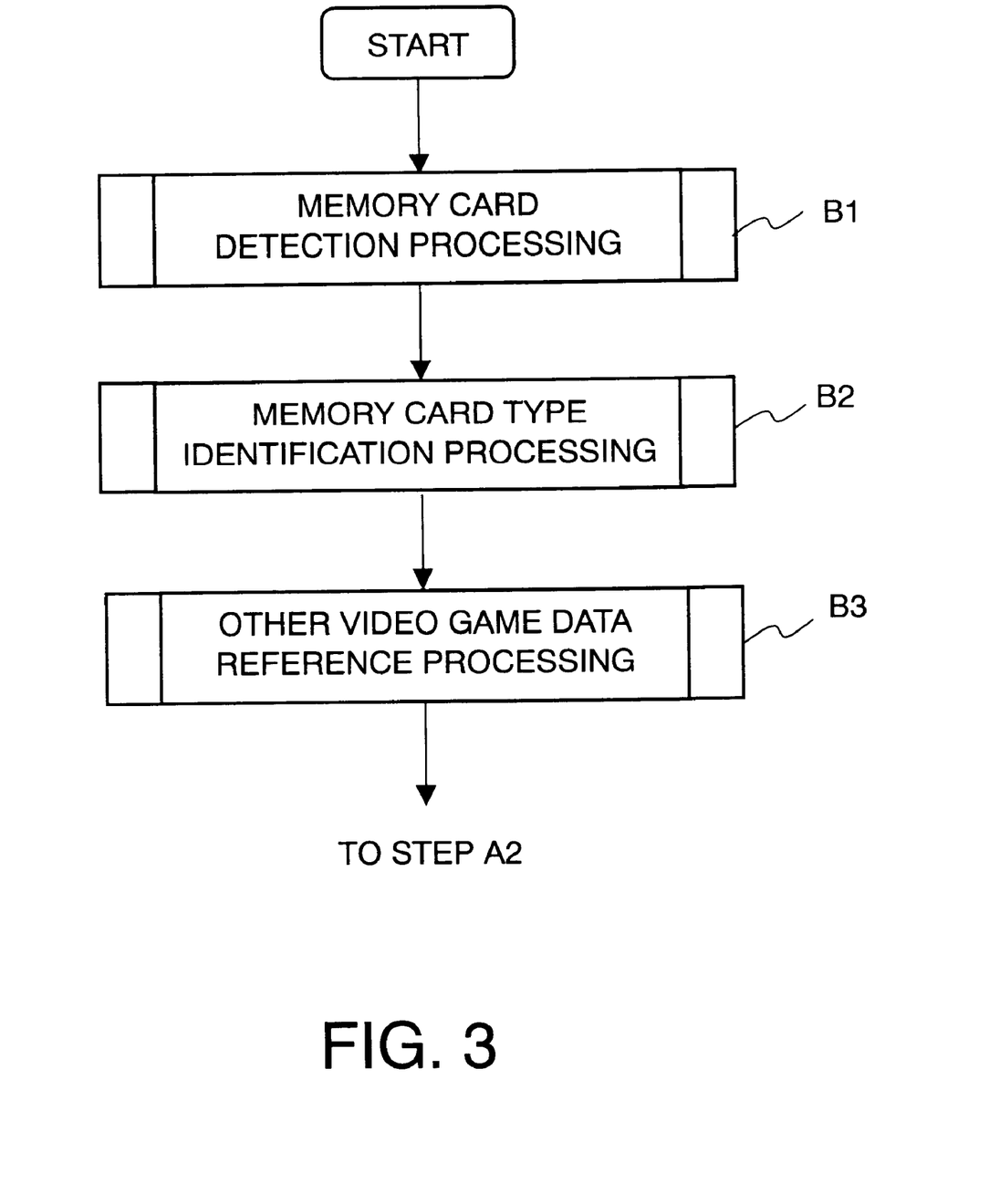
FIG. 3 is a flowchart of candidate character data registration processing.

Candidate character data registration processing is now described with respect to FIG. 3. This processing consists, broadly speaking, of: memory card detection processing (step B1), memory card type identification processing (step B2), and other video game data reference processing (step B3). These processes are described below.

(a) Memory Card Detection Processing

This processing is executed for detecting whether or not a memory card 153 is connected to the communications control device 151 and registering previously prepared character data as candidate character data, in the event that no memory card 153 is connected.

Figure 4:
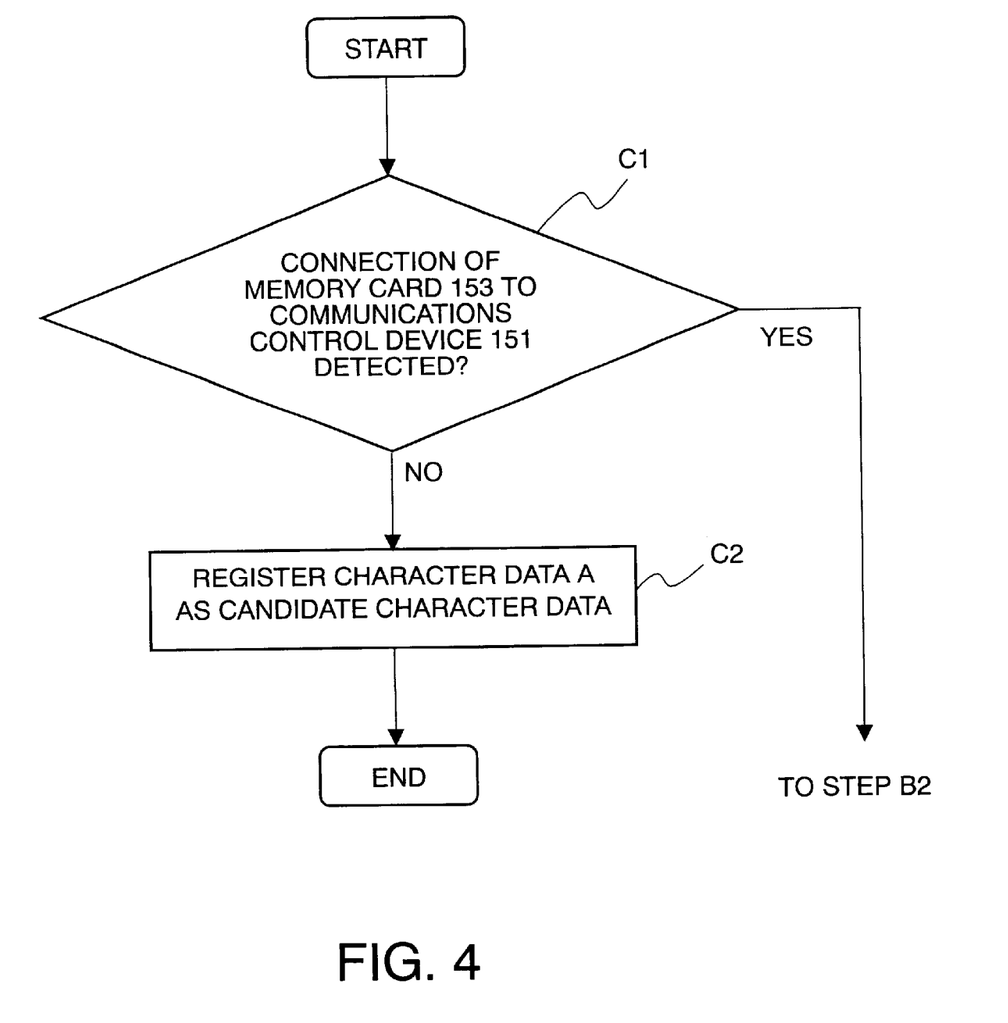
FIG. 4 is a flowchart of memory card detection processing.

As shown in FIG. 4, the communications control device 151 checks whether or not a memory card 153 is connected (step C1). If one is connected, then it proceeds to the memory card type identification processing in step B2, and if one is not connected, then the character data A is registered as candidate character data. The character data A is previously stored on the CD-ROM, along with the video game program 200.

(b) Memory Card Type Identification Processing

This processing is processing for identifying whether the type of the memory card 153 connected to the communications control device 151 is type 1, 2, or 3, and registering different candidate character data according to the identified type.

Figure 5:
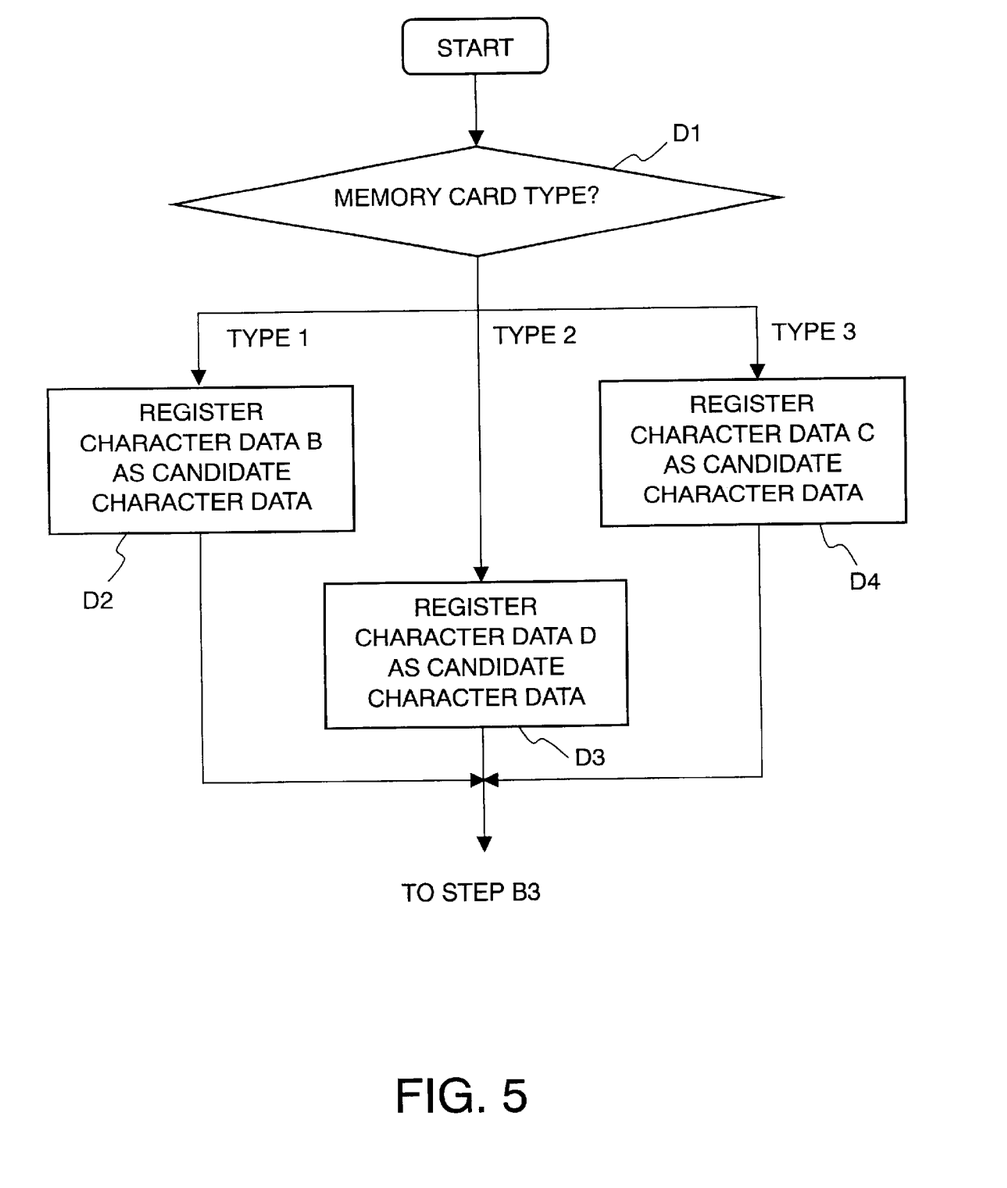
FIG. 5 is a flowchart of memory card type identification processing.

Looking now at FIG. 5, firstly, the type of memory card 153 connected to the communications control device 151 is identified (step D1). If the memory card 153 is type 1, then the character data B is registered as the candidate character data (step D2). If the memory card 153 is type 2, then the character data C is registered as candidate character data (step D3). If the memory card 153 is type 3, then the character data D is registered as candidate character data (step D4). Similarly to the character data A, the character data B, C and D are stored previously on the CD-ROM along with the video game program 200. Once either the character data B, C, or D has been registered as candidate character data in this manner, the sequence proceeds to the other video game data reference processing at step B3.

(c) Other Video Game Data Reference Processing

This processing is processing for registering candidate character data according to the data stored in the memory card 153.

Figure 6:
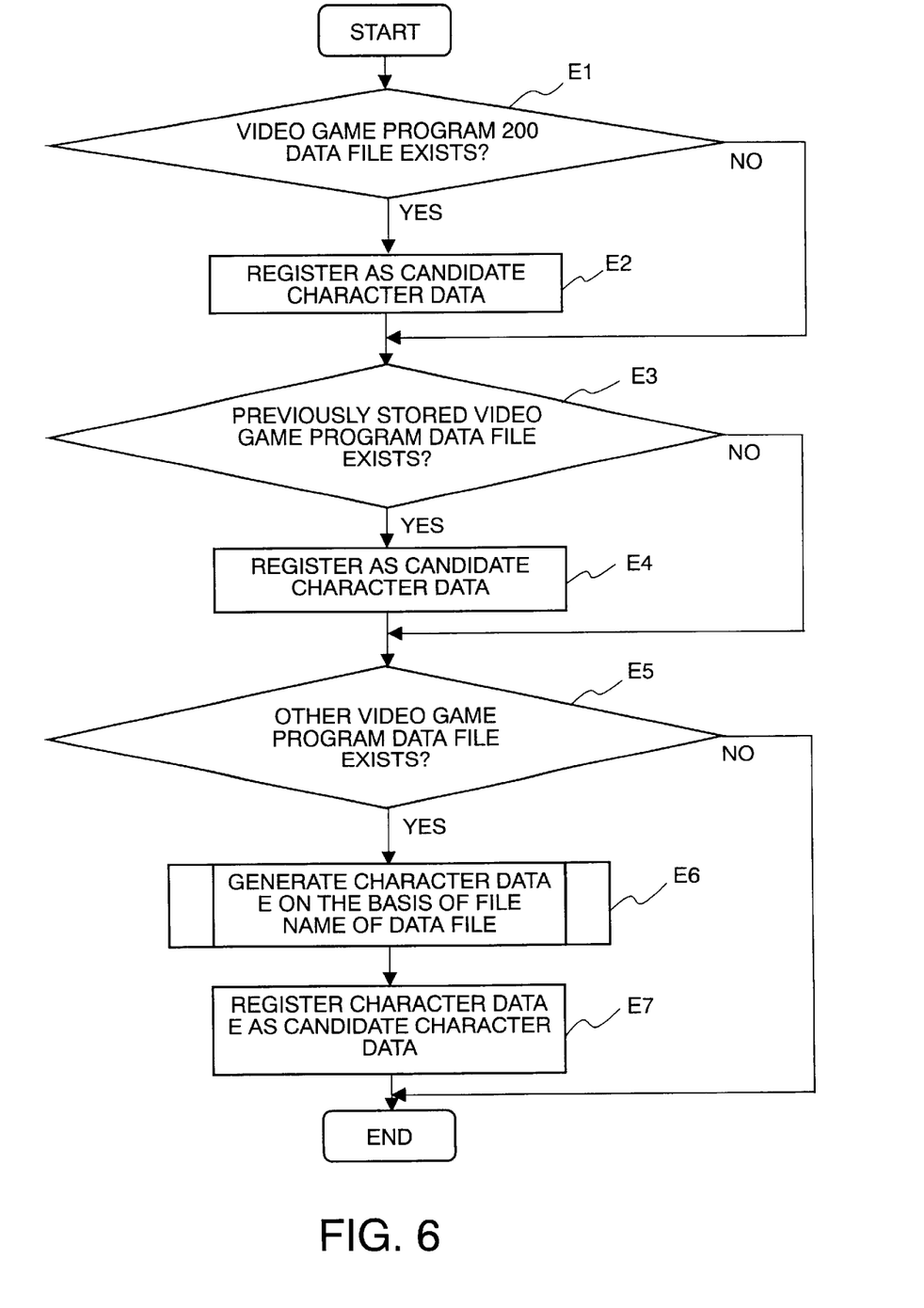
FIG. 6 is a flowchart of other video game data reference processing.

Referring to FIG. 6, firstly, the video game program 200 checks whether or not user data for the video game program 200 is present in the data file stored in the memory card 153 (step E1). If such data is present, then it registers the character data contained in the user data as candidate character data (step E2).

Thereupon, the video game program 200 checks whether or not a data file with a known format is stored in the memory card 153 by video game programs other than the video game program 200 (step E3). If such a data file exists, then character data is generated on the basis of that data file and is registered as candidate character data (step E4).

Herein, it is assumed that a data file with a known format is created by another video game program written by the same author as the video game program 200. For example, the video game program may be a previous version of the video game program 200 sold in a series of programs.

Moreover, the video game program 200 also checks whether or not there exists a data file having an unknown format (step E5), and if such a file is present, then character data E is generated on the basis of the file name of that data file (step E6), and registered as candidate character data (step E7).

Figure 7:
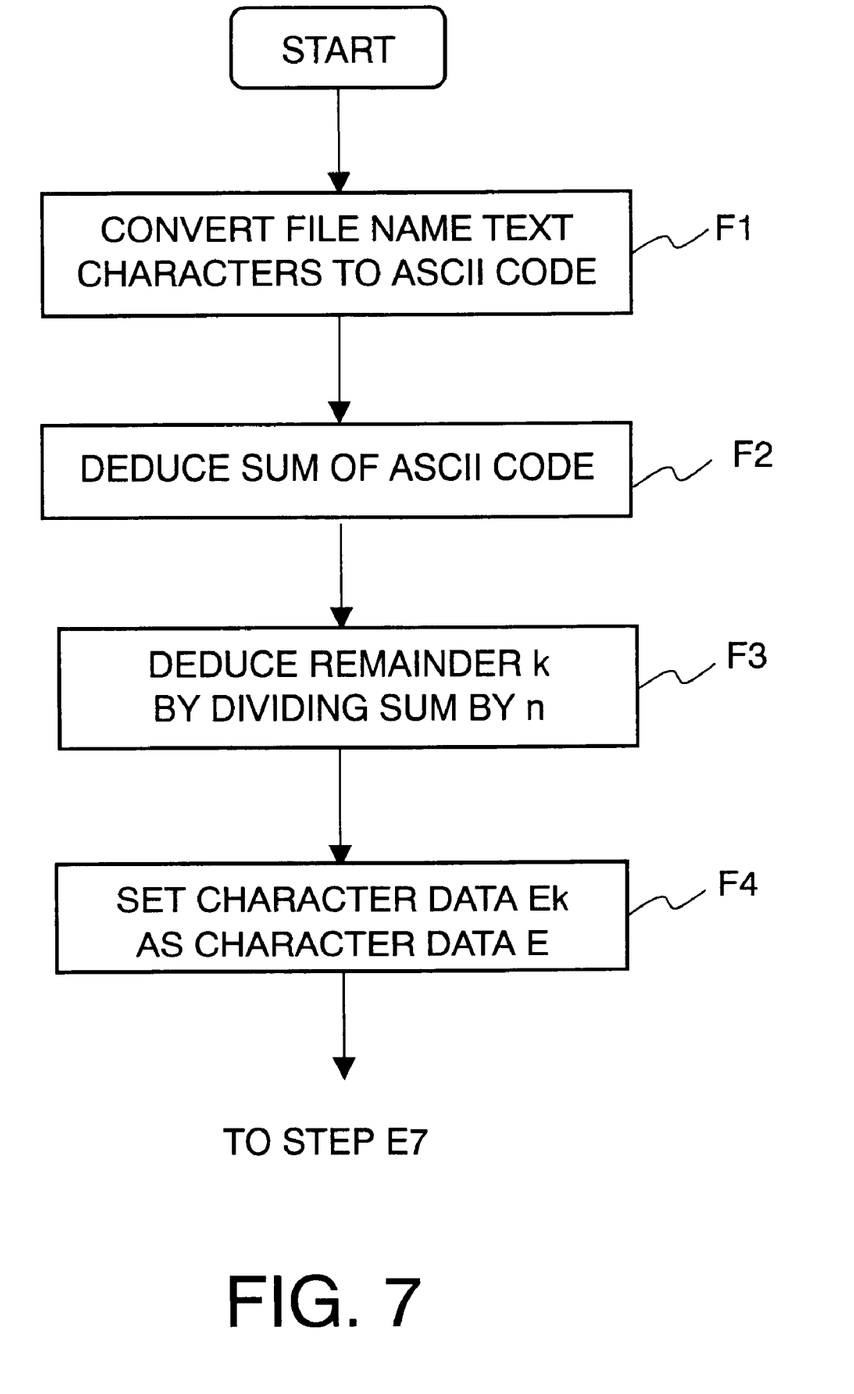
FIG. 7 is a flowchart describing a process for generating character data E on the basis of a filename in a data file.

Step E6 is now described with reference to FIG. 7. Firstly, of the various files stored on the memory card 153, a file name generated by the video game program 200 or another video game program having an unknown data format is read out from the memory card 153, and converted to ASCII code (step F1). Thereupon, the sum of that ASCII code is derived (step F2), and this sum is divided by a natural number n, to determine a remainder k (step F3). Thereupon, the character data $E_k$ is selected from the character data $E_1, E_2, \ldots E_{n-1}$, stored on the CD-ROM along with the video game program 200 (step F4).

By means of the aforementioned candidate character data registration processing, it is possible to register as candidate character data, different character data according to the state of the memory card, in other words, whether or not a memory is loaded, the type of memory card, the data stored on the memory card by a video game other than the video game program 200, and the file name of that data.

The present embodiment has thus far been described on the premise of a contest between a player character and a CPU character, but the present invention may also be applied to a contest between player characters. Furthermore, it was supposed that each of the character data A–E is stored on the CD-ROM along with the video game program 200, but it is also possible to incorporate a procedure for generating character data according to input values into the video game program 200, and to generate character data by inputting the numerically converted state of the memory card into this procedure.

According to the present invention, the character data of the selectable contest opponents can be changed according to the state of the memory card, and hence it is possible to prevent a player from becoming bored with the contest.

Moreover, because the candidate character data registered by other video game data reference processing changes according to what kind of video game data is stored on the memory card, it is possible to impart a feeling of tension to the player, since the player cannot readily predict the type of contest opponents that can be selected. At the same time, it is also possible to provide the player with the possibility of consciously changing the type of video game storing data on the memory card, in order to search for a game character against which he or she has never competed.

What is claimed is:

1. A game character generation method of generating a game character in accordance with a first video game program, which is stored in a first storage device of a video game device and is executed by a first type video game device, said method comprising the steps of:

accessing a data set that was generated by a second video game program, which is different from the first video game program, executed on said first type video game device; and generating the game character by referencing the data set and executing the first video game program by said first type video game device.

2. The game character generation method according to claim 1, further comprising the step of judging whether a second storage device, which is detachable from the video game device, is attached to the video game device or not;

wherein the game character generating step generates a predetermined game character stored in the first storage device if the second storage device is detached from the video game device.

3. The game character generation method according to claim 1, wherein:

the video game device comprises a second storage device which is detachable from the video game device; and the game character generating step generates the game character by referencing the data set stored in the second storage device by the additional video game program.

4. The game character generation method according to claim 1, wherein:

the video game device comprises a second storage device which is detachable from the video game device; and the game character generating step generates the game character by referencing a file name of the data set stored in the second storage device by the additional video game program.

5. The game character generation method according to claim 1, wherein the video game program is of a competitive type between a plurality of the game characters.

6. The game character generation method according to claim 5, wherein at least one game character of the plurality of game characters participating in a competition is generated by the video game program.

7. A game character generation method of generating a game character in accordance with a video game program which is stored in a first storage device of a video game device and is executed by the video game device, said method comprising the steps of:

judging whether a second storage device, which is detachable from the video game device, is attached to the video game device or not;

accessing a data set generated by an additional video game program which is different from the video game program and is executed by the video game program;
   generating the game character by referencing the data set, wherein said generating step comprises generating a predetermined game character stored in the first storage device if the second storage device is detached from the video game device; and
storing prior to the game character generating step, the data set which serves to generate the predetermined game character and which is stored in the first storage device.

8. A game character generation method of generating a game character in accordance with a video game program which is stored in a first storage device of a video game device and is executed by the video game device, said method comprising the steps of:
   judging whether a second storage device, which is detachable from the video game device, is attached to the video game device or not;
      accessing a data set generated by an additional video game program which is different from the video game program and is executed by the video game program;
      generating the game character by referencing the data set, wherein said generating step comprises generating a predetermined game character stored in the first storage device if the second storage device is detached from the video game device; and
      wherein the second storage device is classified into a plurality of species;
   the method further comprising the steps of:
      further accessing at least one additional data set generated by an additional video game program different from the video game program;
      detecting the species of the second storage device attached to the video game device; and
      selecting one of the data sets and the additional data set stored in the first storage device according to the species detected at the detecting step; wherein the game character generating step generates the game character by referencing the selected data set.

9. A game character generation method of generating a game character in accordance with a video game program which is stored in a first storage device of a video game device and is executed by the video game device, said method comprising the steps of:
   accessing a data set generated by an additional video game program which is different from the video game program and is executed by the video game program; and
   generating the game character by referencing the data set,
   wherein the video game program is of a competitive type between a plurality of the game characters, and
   wherein:
      the video game program is for performing a competitive type card game; and
      the data set defines cards possessed by the game character.

10. A computer-readable storage medium storing a first video game program that is executed by a first type video game device which comprises a first storage device for installing the storage medium; the video game program comprising the steps of:

accessing a data set that was generated by a second video game program, which is different from the first video game program, executed on said first type video game device; and
generating the game character by referencing the data set and executing the first video game program by said first type video game device.

11. The storage medium according to claim 10, the video game program further comprising the step of judging whether a second storage device, which is detachable from the video game device, is attached to the video game device or not; wherein the game character generating step generates a predetermined game character stored in the first storage device if the second storage device is detached from the video game device.

12. The storage medium according to claim 10, wherein:
   the video game device comprises a second storage device which is detachable from the video game device; and
   the game character generating step generates the game character by referencing the data set stored in the second storage device by the additional video game program.

13. The storage medium according to claim 10, wherein:
   the video game device comprises a second storage device which is detachable from the video game device; and
   the game character generating step generates the game character by referencing the file name of the data set stored in the second storage device by the additional video game program.

14. The storage medium according to claim 10, wherein the video game program is of a competitive type between a plurality of the game characters.

15. The storage medium according to claim 14, wherein at least one game character of the plurality of game characters participating in a competition is generated by the video game program.

16. A computer-readable storage medium storing a video game program which is executed by a video game device which comprises a first storage device for installing the storage medium; the video game program comprising the steps of:
   accessing a data set generated by an additional video game program which is different from the video game program and is executed by the video game program;
   judging whether a second storage device, which is detachable from the video game device, is attached to the video game device or not; and
   generating the game character by referencing the data set, wherein said generating step comprises generating a predetermined game character stored in the first storage device if the second storage device is detached from the video game device; and
   storing the data set which serves to generate the predetermined game character and which is stored in the first storage device.

17. A computer-readable storage medium storing a video game program which is executed by a video game device which comprises a first storage device for installing the storage medium; the video game program comprising the steps of:
   accessing a data set generated by an additional video game program which is different from the video game program and is executed by the video game program;
   judging whether a second storage device, which is detachable from the video game device, is attached to the video game device or not; and generating the game character by referencing the data set, wherein said generating step comprises generating a predetermined game character stored in the first storage device if the second storage device is detached from the video game device; and wherein the second storage device is classified into a plurality of species;

the video game program further comprising the steps of:
further accessing at least one additional data set generated by an additional video game program different from the video game program;
detecting the species of the second storage device attached to the video game device; and
selecting one of the data sets and the additional data set stored in the first storage device according to the detected species;

wherein the game character generating step generates the game character by referencing the selected data set.

18. A computer-readable storage medium storing a video game program which is executed by a video game device which comprises a first storage device for installing the storage medium; the video game program comprising the steps of:

accessing a data set generated by an additional video game program which is different from the video game program and is executed by the video game program;

generating the game character by referencing the data set, wherein the video game program is of a competitive type between a plurality of the game characters, and wherein:
the video game program is for performing a competitive type card game; and
the data set defines cards possessed by the game character.

19. A video game device for executing a plurality of video game programs, comprising:

a first storage device for storing at least a first video game program and user data sets each of which is generated by one of the video game programs;

a second storage device for storing at least a second video game program and a data set generated by another one of the video game programs, and accessing means for accessing both the first storage device and the second storage device in accordance with the first video game program to generate a game character with reference to the second video game program and data set stored in said second storage device.

* * * * *